United States Patent [19]

Dennison

[11] 4,342,625
[45] Aug. 3, 1982

[54] MODULAR AUTOMATIC WATER DISTILLER

[76] Inventor: Clifford C. Dennison, 440 Centenary Ave., Cleveland, Tenn. 37311

[21] Appl. No.: 188,853

[22] Filed: Sep. 19, 1980

Related U.S. Application Data

[63] Continuation-in-part of Ser. No. 25,922, Apr. 2, 1979, abandoned.

[51] Int. Cl.³ .............................................. B01D 3/02
[52] U.S. Cl. .................................... 202/181; 202/193; 202/196
[58] Field of Search ............... 202/196, 187, 180, 181, 202/187, 160, 159, 177, 185 D, 185 E, 193, 206, 235; 251/235; 159/DIG. 13

[56] References Cited

U.S. PATENT DOCUMENTS 2,202,008  5/1940  Ittner ................................... 202/187
4,089,750  5/1978  Kirschman et al. ................ 202/180

*Primary Examiner*—Frank Sever
*Attorney, Agent, or Firm*—Barnes, Kisselle, Raisch & Choate

[57] ABSTRACT

Water distillation apparatus including separable evaporator storage reservoir and condensing modules coupled to each other in vertical succession. A fluid coil is suspended within the condensing module and is coupled to feed water from a source such as a domestic tap to the evaporator module. A vapor column including a spiral baffle extends through the storage reservoir module to direct steam generated in the evaporator module to the vicinity of the fluid coil, such that the coil affects heat exchange between inlet water and the surrounding steam to preheat the water prior to entry into the evaporator module and to condense the steam for flow by gravity into the storage reservoir module.

10 Claims, 9 Drawing Figures

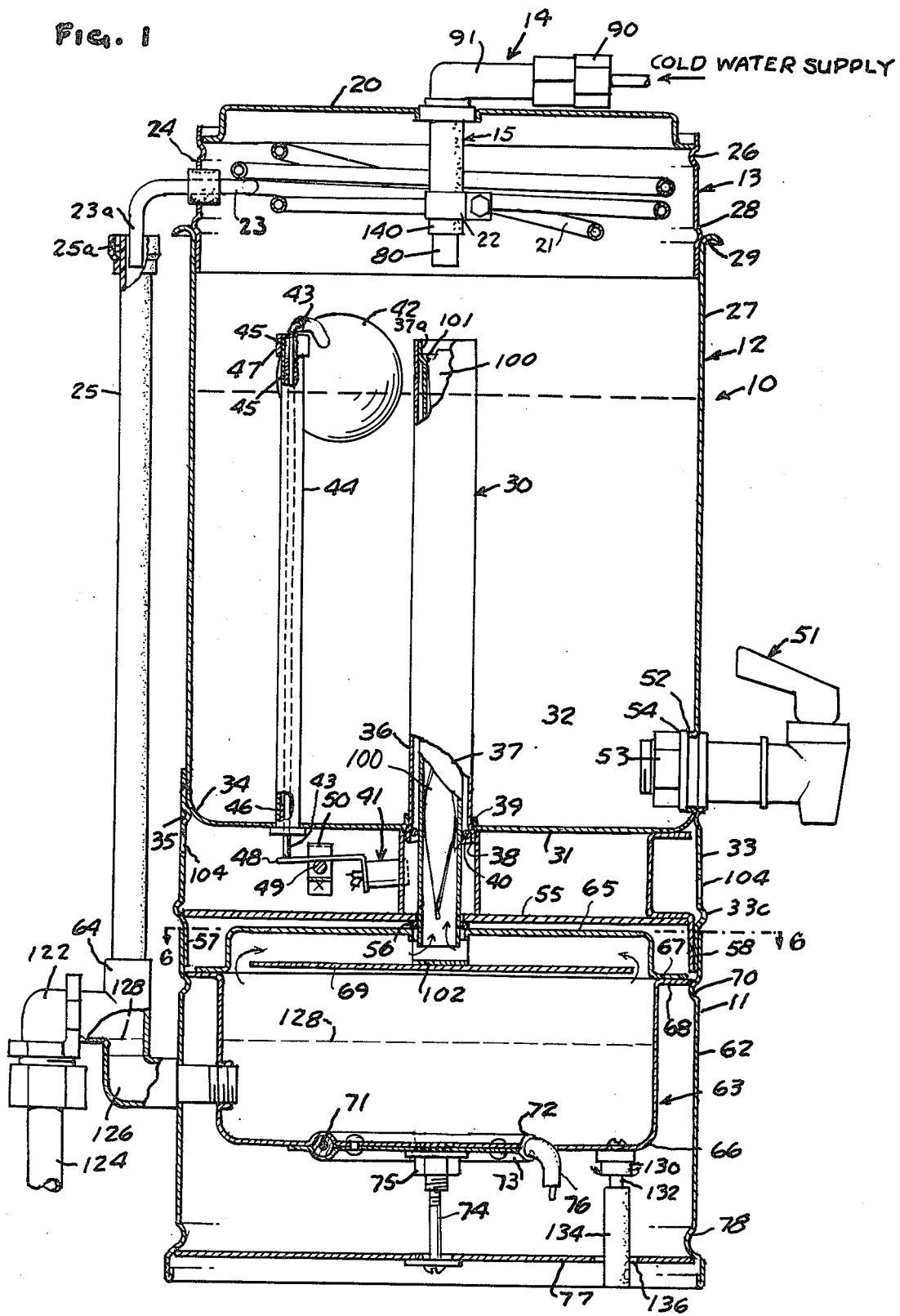

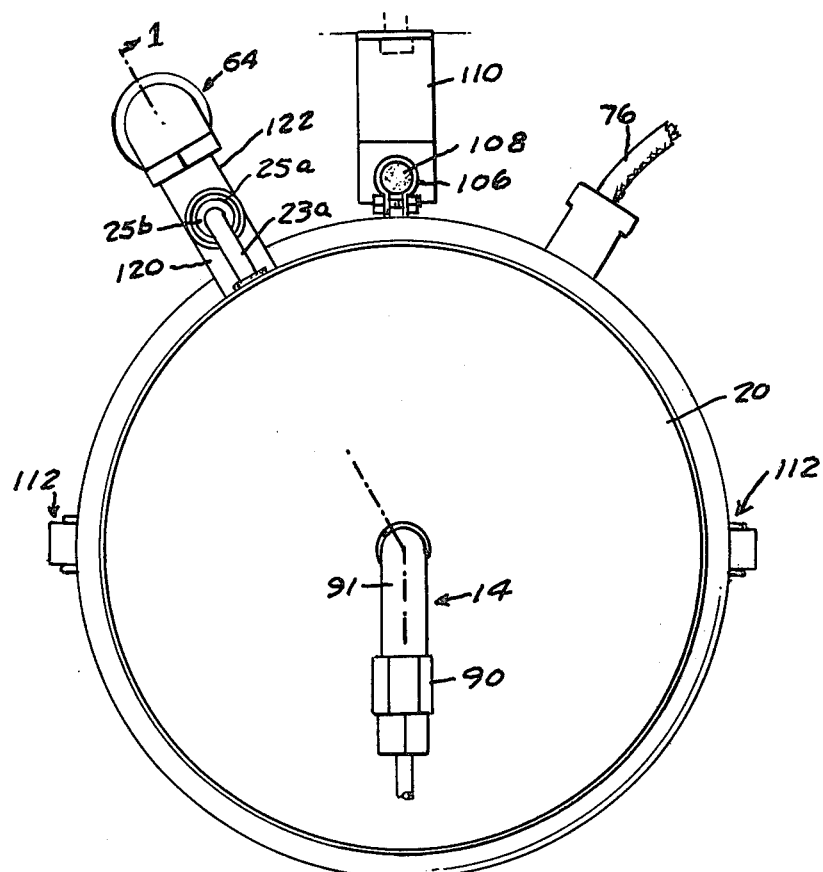
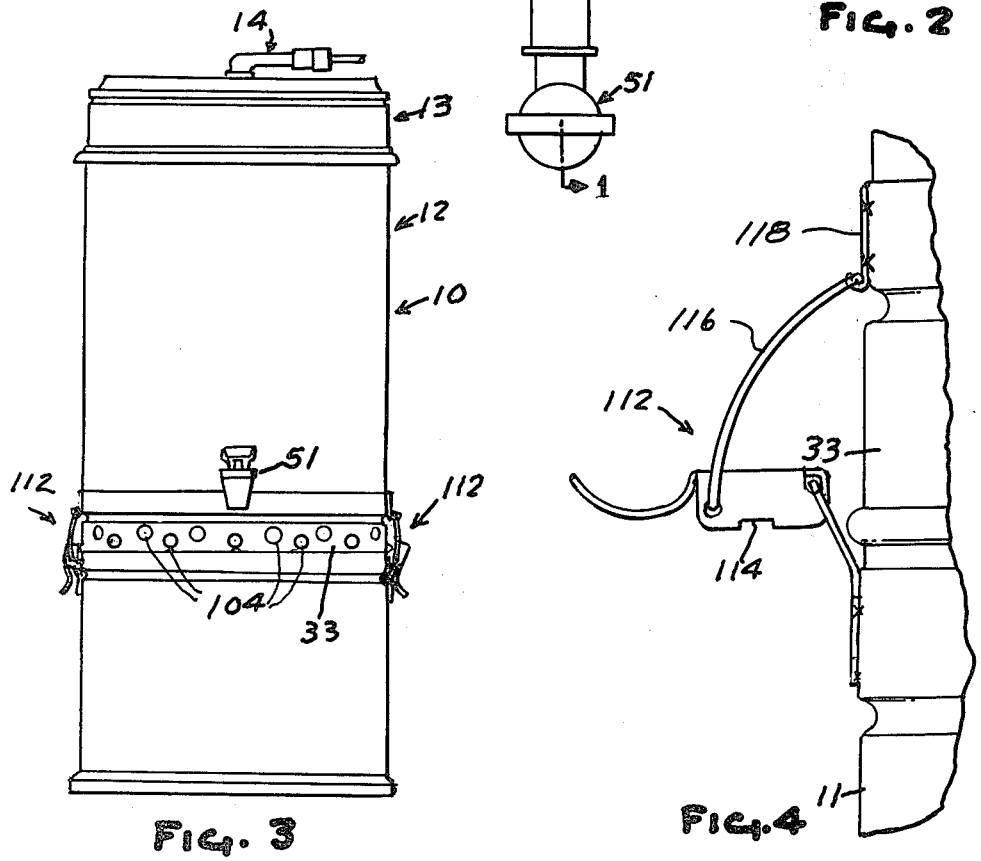

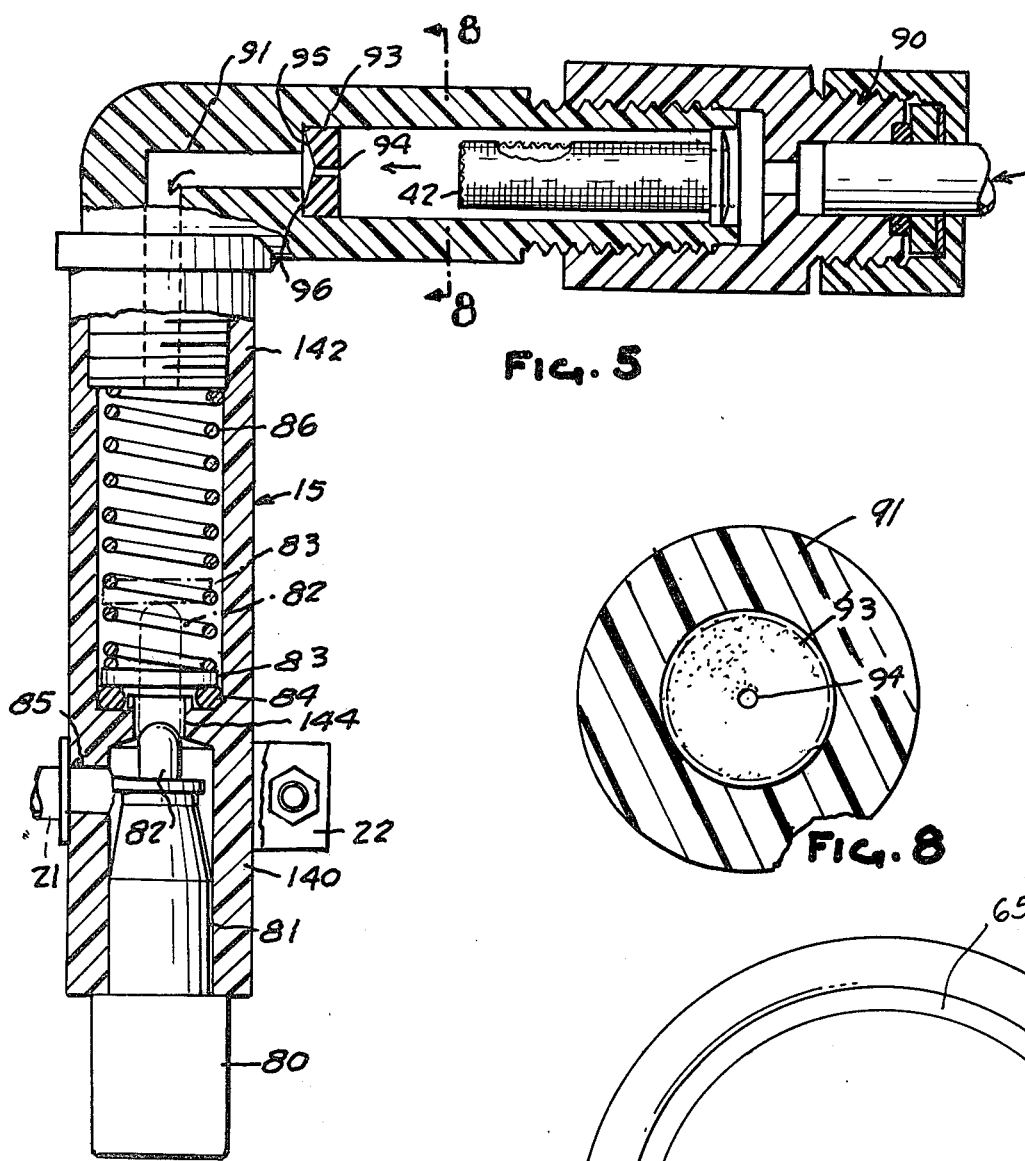

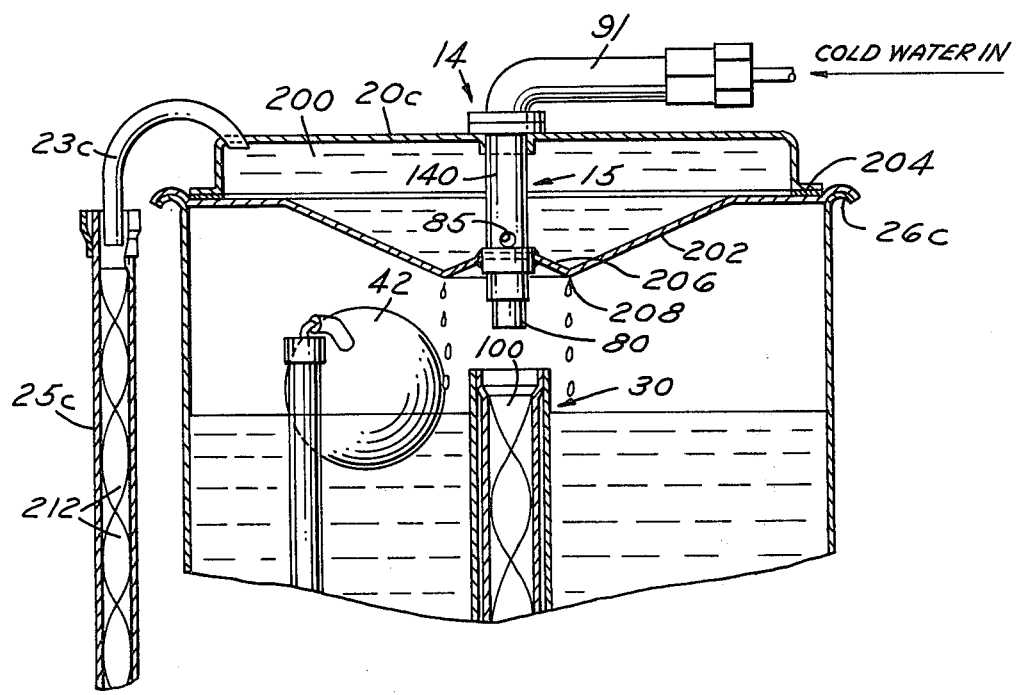

MODULAR AUTOMATIC WATER DISTILLER

CROSS REFERENCE TO RELATED APPLICATION

This application is a continuation-in-part of application Ser. No. 25,922, filed Apr. 2, 1979 and now abandoned.

This invention relates to water distillation and particularly to automatic water distillers for use in the home, office or laboratory.

BACKGROUND AND SUMMARY OF THE INVENTION

The tap water in most homes contains various substances which may be hazardous to health. This is because many carcinogens, toxic chemicals and poisonous heavy metals from industrial waste water effluents, run-off from farms, animal feed lots and city streets, and waste water effluents from homes and municipal sewage treatments systems find their way into our drinking water supplies. Many of these dissolved substances cannot be removed by currently used methods of water treatment and purification. Thus, many of the water supply systems in the United States fail to meet the present U.S. Public Health Service drinking water standards. Even if some means were found for removing dissolved chemicals from the water at the water treatment plant, the pure water produced could not be delivered in pure form to the home through existing plumbing. Poisonous cadmium, for example, may be picked-up in transit from galvanized pipe and plumbing, toxic copper from copper plumbing, and poisonous lead from lead plumbing.

While various types of bottled water are sold for drinking purposes, many fail to meet the standards of the U.S. Public Health Service for drinking water. Thus, safe drinking water is not necessarily obtainable through the purchase of water, either from a water system or bottled water.

One satisfactory way of providing safe drinking water is to produce distilled water in the home by means of a home distiller. This removes virtually all of the undesired substances from the water such as organic materials, toxic chemicals and poisonous heavy metals.

One objective of the present invention is to provide an adequate storage reservoir for the distilled water produced which will keep the water from becoming contaminated with airborne substances such as microorganisms and viruses. Another objective is to provide a distillation apparatus which can be easily and conveniently dismantled for cleaning and maintenance. A third objective is to provide a distiller that can easily be kept clean of "scale" which is a particularly severe problem in hard water areas. A fourth objective is to provide a fully automatic water distiller that can be operated by technically unskilled persons such as the average housewife. A fifth objective is to provide a home water distiller that can be conveniently mounted on or in a cabinet or on a wall. The wall or cabinet mounting should not only get the distiller off the counter top but should facilitate cleaning and maintenance. A sixth objective is to provide a fully automatic home water distiller that produces laboratory quality pure water.

The present invention satisfactorily solves the foregoing objectives by providing an automatic water distillation apparatus designed primarily for home use, although it can be employed for laboratory use.

In accordance with the invention, the fully automatic water distillation apparatus has a self-contained distillate storage reservoir which is an integral part of the condensing system. Thus, the storage reservoir is automatically steam sterilized with each cycle of operation. This protects the user against airborne organisms, viruses and other contaminants without the need for additional attention or care.

The invention also provides a modular type distillation apparatus that facilitates maintenance and cleaning. This is accomplished by a self-contained storage reservoir serving as the body of the apparatus. The preheating and condensing module is removably inserted into the top part of the storage reservoir module and the evaporator module is removably connected to the bottom of the storage reservoir module.

The invention also provides a distillation apparatus that can easily be kept clean of scale. This is accomplished by coating the surfaces of the evaporator with scale resistant substances such as flouroplastic, eg TEFLON, by using scale resistant materials such as CPVC for feedwater tubing and fittings, and by mounting the electrical resistance heating element to the external surface of the evaporator.

The invention also provides a fully automatic distillation apparatus that can be operated by the average domestic user who has minimal technical skills. This is accomplished by a float operated switch that is activated by the water level in the storage reservoir, by a thermostatically controlled water inlet valve that turns the supply water to a preheating and condensing coil on and off when steam is available for heat exchange with the supply water, by a water flow control fitting that provides a constant rate of water flow to the preheating and condensing coil regardless of fluctuations in line pressure and by a water level control well that maintains a constant water level in the evaporator.

The distillation apparatus can be conveniently mounted on or in an existing cabinet or on a wall. This is accomplished by securing the storage reservoir module to the wall or cabinet by a mounting bracket. To facilitate cleaning, the evaporator is removably connected to the bottom end of the storage reservoir module.

The fully automatic water distillation apparatus is designed for home use but also produces pure laboratory quality distilled water. This is accomplished by preheating the water to drive off volatile gases and low boiling substances and providing a venting means through which these substances can escape, by providing a relatively long insulated vapor column which prevents excessive heat loss from the rising steam and which encloses a spiral baffle on which high boiling substances that inadvertently escape the evaporator may condense and drain back into the evaporator, and by providing a further baffling apparatus that prevents water droplets from being carried by the column of rising steam into the condensing apparatus and which also provides sufficient surface area on which the droplets can condense.

This invention relates to a water distillation apparatus having an evaporator module including an evaporator means disposed within a casing. A distillate storage reservoir module is removably connected to the evaporator module. An insulated vapor column is disposed within and as an integral part of the storage reservoir module. A condensing and preheating module is removably carried by the storage reservoir module, and a water inlet and flow control valve and fitting are connected to a preheating and condensing coil.

Cold water from the household supply enters the preheating and condensing coil through the water inlet valve and flow control fitting. The incoming cold water condenses the steam that impinges upon the condensing side of the coil, while the steam preheats the feedwater flowing through the coil before it leaves the coil and enters the evaporator through the feedwater tube. Steam from the evaporator rising through the vapor column activates the thermostatically controlled valve. The valve opens allowing water to flow through the preheat and condensing coil into the feedwater tube. A portion of the water flowing through said tube enters the evaporator. The excess water is discharged through the drain tube into the household sewer line. The level of the water in the evaporator is maintained by means of a water level control well disposed in the side of said evaporator. The rate of flow of water flowing through the preheat and condensing coil is regulated by means of the flow control fitting. The steam, rising from the evaporator through the vapor column, condenses on the condensing side of the preheating and condensing coil and is collected in the self-contained storage reservoir. When the storage reservoir is full, a float activated switch electrically disconnects the electrical resistance heating element. If approximately one liter of water is withdrawn from the reservoir, the heating element is reactivated. If the cold water supply is interrupted, a high temperature circuit breaker electrically disconnects the heating element. The circuit breaker must be manually reset before the heating element will operate.

In a modified embodiment of the invention, the preheat and condensing coil is replaced by a preheat chamber defined by a condensing surface plate sealingly mounted around its periphery to the wall of the storage module. An inverted U-shaped discharge tube extends from within the preheat chamber to the feedwater tube, and thence to the evaporator chamber. The apex of the discharge tube is at or above the level of the top wall of the preheat chamber, such that the preheat chamber must be full to feed water to the evaporator chamber due to water inlet pressure. By maintaining the preheat chamber full at all times, evapporation is minimized, thereby reducing or eliminating accumulation of scale. A spiral vent plate or baffle extends downwardly through the feedwater tube for enhanced venting of volatile gases and low boiling substances in the feedwater.

DESCRIPTION OF THE DRAWINGS

FIG. 1 is a sectional elevational view of an automatic distillation apparatus embodying the invention and is taken along the line 1—1 in FIG. 2.

FIG. 2 is a plan view of the same.

FIG. 3 is a front elevational view on a reduced scale.

FIG. 4 is a fragmentary side elevational view on an enlarged scale.

FIG. 5 is a vertical sectional view of a part or subassembly of the apparatus.

FIG. 6 is a sectional view taken along the line 6—6 in FIG. 1.

FIG. 7 is a fragmentary sectional view taken along the line 7—7 in FIG. 6.

FIG. 8 is a sectional view taken along the line 8—8 in FIG. 5.

FIG. 9 is a fragmentary sectional elevational view similar to the upper portion of FIG. 1 and illustrating a modified embodiment of the invention.

DESCRIPTION

Referring to the drawings, a presently preferred embodiment of the water distillation apparatus 10 provided by the invention includes an evaporator module 11 (FIG. 1) removably suspended beneath a storage reservoir module 12. A water preheating and condensing module 13 is removably inserted into and carried by the upper end of the storage reservoir module 12.

Water from the household cold water supply line enters the distillation apparatus 10 through the flow control fitting 14 (FIGS. 1, 5 and 8) and water control valve 15 (FIGS. 1 and 5). Fitting 14, to be described in detail in connection with FIGS. 5 and 8, provides a constant flow of feedwater regardless of the fluctuation in line pressure. Valve 15, to be described in connection with FIG. 5, cuts the feedwater on and off thermostatically responsive. Valve 15 is inserted by press fit into the top wall or cover 20 of module 13 and is frictionally held in place in the top wall.

A preheating coil 21 of stainless steel tube stock is supported on the water control valve by a clamp 22 forming a connection to valve 15 at one end. The other end 23 of coil 21 extends through a bushing in the wall 24 of module 13 into the open upper end 25a of a downpipe 25. It will be noted with particular reference to FIGS. 1 and 2 that the downwardly turned tip 23a of coil end 23 is loosely received in downpipe end 25a and is separated therefrom by an annular air gap 25b (FIG. 2). An annular inwardly formed bead 26 on wall 24 retains cover 20 in position. Cold water, which is supplied to preheating coil 21, is in heat exchange relation with steam produced in the evaporator module 11 and supplied by means of vapor column 30. Wall 24 of the preheating and condensing module 13 is telescoped in the wall 27 of the storage reservoir module 12 and is retained by interengagement of an annular convex bead 28 and a lip 29 on the walls 24,27, respectively.

Flow control fitting 14, control valve 15, preheating coil 21, cover 20 and wall 24 thus comprise the water preheating and condensing subassembly or module 13. Module 13 is removably inserted into storage reservoir 32 and is retained in position by means of convex bead 28 resting on lip 29. Wall 27 and a bottom 31 integral therewith form a storage reservoir 32 which is press fitted into a connecting band 33 and is retained in position by engagement of the curved lower peripheral edge 34 of reservoir 32 with concave annular bead 35 on band 33. A plurality of cooling apertures 104 (FIGS. 1 and 3) are formed in band 33.

A vapor column 30 comprises coaxially telescoped tubes 36,37 radially spaced from one another by an insulating air space. The flared upper end 37a (FIG. 1) of inner tube 37 is connected to the upper end of outer tube 36 by being pressed into tube 36 and spot welded thereto. The flared lower end 38 of tube 36 is connected to bottom 31 of reservoir 32 by being pressed into the wall flange 39 and silver soldered thereto. Inner tube 37 is spaced from outer tube 36 at the lower end of tube 36 by an O-ring 40 seated in the flared end 38. This construction restricts heat from the rising steam in inner tube 37 from flowing across the insulating space between tubes 36,37. A spiral baffle 100 is removably suspended within tube 37 by the laterally flared tangs 101 at the baffle upper end which engage the flared tube end 37a. Baffle 100 comprises a flat section of stainless steel ribbon stock twisted approximately 360° uniformly throughout its length.

The distillation apparatus 10 is turned on and off by means of a float activated mercury switch 41. A float 42 is connected to a rod 43. Rod 43 is vertically slidable in a rod support tube 44 and within guide bushings 45 and 46 which are inserted into each end of tube 44. A sealing cap 47 is soldered to rod 43 to prevent condensate from leaking through tube 44 and damaging switch 41. Switch 41 is mounted on one end of a lever 48 which, in turn, is pivotally carried by a rod 49 affixed to band 33 by brackets 50. Float rod 43 engages an end of lever 48 remote from switch 41.

A faucet 51 (FIGS. 1-3) provide for withdrawing distilled water from reservoir 32. Faucet 51 is inserted through a hole 52 and is retained in position by the nut 53 and washer 54. A plate 55 (FIG. 1) provides a bottom cover for the housing enclosing switch 41. Plate 55 is retained in position against a lower end of outer column tube 36 by a retaining O-ring 56 which snugly encircles inner tube 37. Storage reservoir 32, with all components, and connecting band 33, with all components, thus comprise the storage reservoir module 12. Vertically aligned brackets 106 (FIG. 2) are welded externally to wall 27 and capture plugs 108 for suspending storage module 12 from suitable wall brackets 110.

The evaporator module 11 comprises an outer generally cylindrical wall 62 and an evaporator chamber 63. Evaporator module 11 is removably fitted into storage module 12 by having the upper free edge 58 of evaporator wall 62 fitted telescopically over the lower edge 57 of band 33. Evaporator module 11 is retained against a convex bead 33a on band 33 by the clips 112 (FIGS. 2-4). Clips 112 comprise cam-type locks 114 fixedly mounted on evaporator wall 62 and having pivotal locking wires 116 extending upwardly therefrom for releasable engagement with the tabs 118 welded to band 33.

Water from the preheating coil 21 passes to feedpipe 25 thence through water level control fitting 64 to evaporator chamber 63. Fitting 64 includes a tubular outlet 120 (FIG. 1) threaded into a side wall of evaporator chamber 63. A drain feed fitting section 122 extends laterally from fitting 64 above outlet 120 and is adapted to be coupled as by a hose 124 to a disposal sewer. Thus, a well 126 is defined within fitting 64 between outlet 120 and drain 122 which controls the water level in evaporator 63 at the level 128 (FIG. 1) of drain 122. Excess feedwater, if any, will be fed through drain 122.

Evaporator chamber 63 comprises an upper part 65 and a lower part 66 having interengaging horizontal flanges 67,68 (FIG. 1). Flange 68 is vertically supported by the concave annular bead 70 to hold evaporator chamber 63 in position within evaporator module 11. A flat circular baffle 69 (FIGS. 1, 6 and 7) is centrally suspended beneath the lower end of vapor column 30 by a bracket 102 welded to upper portion or top 65 of evaporator chamber 63. Top 65, bracket 102 and baffle 69 form an integral subassembly (FIGS. 6 and 7). An electric heating coil 71 is positioned externally of chamber 63 in a complementary groove 72 in the bottom of part 66, and is held in position by a clamp plate 73 rivited to part 66 or by compressing the lips of the groove around the heating coil. A bottom cover 77 is retained in position against a bead 78 on wall 62 by means of a bolt 74 threadably engaged in a nut 75 which is secured to clamp plate 73. A thermal cut-out switch 130 (FIG. 1) is mounted to the base 66 of pan 63, and has a reset button 132 effectively made accessible by an extender 134 through an opening 136 in bottom 77. Float-controlled switch 41, thermal cut-out 130 and evaporator coil 71 are electrically connected in series (not shown) and are adapted for connection to a wall socket or the like by a line cord 76 (FIG. 2).

Water flows from preheating coil 21 through feedwater tube 25 into evaporator 11. Steam produced in evaporator chamber 63 flows around baffle 69, across the underside of cover part 65 and up around spiral baffle 100 in vapor column 30 into condensing chamber 32.

An important advantage of this distillation apparatus, due to its construction, is that the condensing chamber and storage reservoir are in open communication having common side walls and no intervening lateral walls. Hot vapors automatically sterilize the storage reservoir with each cycle of operation. This means that the air which displaces water withdrawn from the storage reservoir is sterilized and any airborne bacteria, viruses and other organisms are destroyed. Another advantage of this distillation apparatus is that the flow rate of feedwater and cooling water is regulated at a constant flow rate by means of a flow control fitting 15 to be discussed. This provides a constant flow of water regardless of the change in pressure of the household water supply. Another advantage of this distillation apparatus is that, due to its modular construction, it may be disassembled readily for cleaning and maintenance. A further advantage of this distillation apparatus is that the surface which have a tendency to collect scale are coated with a scale resistant coating, such as TEFLON for example.

An important feature of the invention lies in the provision of means for admitting water to the evaporator only after such water has been preheated. This gives rise to two significant advantages. First, cold water entering the evaporator would reduce the efficiency of the distillation system by cooling the water. Second, impurities and volatile gases should not enter the evaporator as they may become trapped and be carried over into the distillate. Preheating the water will drive these substances off before they enter the evaporator. Note in this connection from FIG. 1 that the end 23a of coil 21 extending from condenser wall 24 is turned downwardly and is loosely received in downpipe 25 to permit escape of hot gases in preheated water through air space 25a. This problem is additionally solved in the present invention by the use of a thermostatically operated water control valve 15. As best seen in FIG. 5, valve 15 is tubular in design and includes a cup shaped power source element 80 filled with wax with thermal expansion properties. One element 80 of the type contemplated herein is marketed by Robertshaw Controls under the trademark POWER PILL. A stem 81 extending from element 80 is pressed into the end of the valve body 140 thereby securing the element to the valve body with the element being suspended by valve body 140 among the hot vapors entering the condensing space (FIG. 1). As the temperature surrounding element 80 rises, the wax in the element expands and raises the plunger 82 slidably carried by stem 81. The end of the plunger 82 impinges against a metal disc 83 lifting it against the force of a return spring 86 off an O-ring seal 84 in the valve seat. Water then flows through valve body 140 from the valve inlet end 142, around disc 83, through an opening 144 in the valve seat and out through an outlet hole 85 to the condensing coil 21

(FIG. 1). Preferably, element 80 opens valve 15 when the steam surrounding the element possesses an effective average temperature sensed by the element of 180°–190° F.

Assume an initial off-mode of operation. When switch 41 and float 42 (FIG. 1) sense a low water level in storage unit 12, current is fed to evaporator coil. Water in evaporator chamber 63 is boiled and rises around baffle 69, and through vapor column 30 to the air space surrounding element 80. Sharp right angle turns around baffle 69 and then up vapor column 30 prevents "lift" of pollutants up the vapor column. Additionally, any pollutants which do escape evaporator chamber 63 are attracted to and condense on the surface of spiral baffle 100, whence the condensate will flow by gravity into the evaporator chamber and not into storage. When such steam reaches 180°–190° F., valve 15 opens and new water is admitted to coil 21. Such water is preheated by the steam and is fed to the evaporator chamber through pipe 25. Excess is routed by fitting 64 to drainage. In the meantime, steam in the airspace surrounding coil 21 condenses on the coil and drips into storage reservoir 12. When the stored water rises, float 42 rises, switch 41 turns off and evaporator coil is de-energized. Water continues to drain through fitting 64 until valve 15 closes, at which time the unit returns to off-mode until water is withdrawn from storage by faucet 51. If evaporator chamber 63 becomes overheated, switch 130 kicks out until reset by actuator stem 132 and extender 134.

A second problem encountered in distilling water for home use relates to regulating the flow rate of water into the condensing coil or into the preheating chamber under variable conditions of water line pressure. It is important that an optimum amount of feedwater enters the distillation system. If too little water enters the condensing coil or preheat chamber, there is insufficient cooling and condensing of the vapors produced in the evaporator. This condition leads to steaming, an accumulation of moisture in the space surrounding the distiller. If too much water enters the distillation system, water is unnecessarily wasted by being flushed down the drain, and more importantly the operating temperature of the distillation system is reduced to the extent that volatile gases and low boiling substances are not excluded from the distillate. Consequently, the water produced retains traces of undesirable chemicals such as chlorine and certain organic substances. This problem is successfully solved in the present invention by employing a water inlet fitting that incorporates a water flow control valve 14. As shown in FIGS. 5 and 8, the fitting comprises a water inlet 90 for connection to a water source (not shown), an outlet 91 threadably received in end 142 of valve body 140, a sediment screen 92 and the flow control washer 93. The flow control washer 93 is made out of a semiflexible substance such as butane rubber, and is constructed with a small orifice 94 and a concave surface 95 that impinges on a flat seat 96 within fitting 91. Water entering the fitting pushes against the washer 93 forcing its concave surface 95 against the flat seat 96. If the water pressure is light, the orifice 94 is at a maximum diameter and a certain flow rate results, depending upon the diameter of the orifice. As pressure increases, the concave surface 95 flattens resulting in partial closing of the orifice 94. The flow rate of the fluid is thus directly proportional to the pressure. Consequently, as the water pressure increases, the diameter of the orifice decreases and this combination of functions results in a flow rate that remains constant under variable pressure conditions. Flow control washer 93 preferably may be purchased from Eaton Corporation.

These two problems are related and, consequently, the water control valve and the water flow control fittings are intrinsically connected. The water flow control fitting 14 has a threaded male end which screws into the tapped female end of the thermostatically operated valve 15, and the two components make up the single functional unit that turns the water into the distiller on and off at the appropriate times as well as regulate the water flow rate regardless of the variability of water pressure.

FIG. 9 illustrates a modification to the basic embodiment of the invention in which elements identical to those previously described are indicated by identical reference numerals, and in which elements structurally and funtionally similar to those previously described are indicated by corresponding reference numerals followed by the suffix "c". In the modified embodiment illustrated in FIG. 9, the preheat and condensing coil 21 (FIG. 1) is replaced by a preheat chamber 200 defined by cover 20c and a downwardly dished condensing surface plate 202. Plate 202 has a periphery carried by lip 26c and sealed to the periphery of cover 20c by the gasket 204. Valve 15 protrudes downwardly through a central opening in plate 202 and is sealed thereto as by soldering. Plate 202 has a reverse or upwardly dished portion 206 immediately surrounding valve 15, such that the low point of plate 202 comprises an annular edge 208 coaxial with and radially spaced from the outer diameter of vapor column 30. Thus, vapor condensing on the lower surface of plate 202 drips into storage reservoir 12 from edge 208 and not into the vapor column. Plate portion 206 is at an angle of 22° with respect to a horizontal plane normal to the vertical axis of valve 15 and column 30.

Water is fed to preheat chamber 200 through valve 15 and valve outlet opening 85 in the manner previously described in connection with FIGS. 1 and 5. An inverted U-shaped discharge tube 210 feeds preheated water from chamber 200 through cover 20c into the upper end of the vent tube or downpipe 25c. In accordance with another important feature of the modification of FIG. 9, the apex of tube 210 is disposed in the normal vertical orientation of the distiller above the level of cover 20c. Thus, chamber 200 must completely fill with inlet water and be forced upwardly therefrom by inlet water pressure through tube 210. When inlet water flow is terminated by valve 15, flow through tube 210 is likewise terminated and the preheat chamber remains full. This feature minimizes evaporation from chamber 200, and thereby minimizes deposition of scale therewithin. In accordance with a further important feature of the modified embodiment of FIG. 9, a spiral plate or baffle 212 is carried within downpipe 25c by agitating and swirling the preheated inlet water for enhanced removal of volatile gases and low boilers.

I claim:

1. Water distillation apparatus of a type adapted for purifying domestic tap water comprising an evaporator chamber including means for heating water in said chamber to form steam, enclosure means defining an enclosed volume positioned above said evaporator chamber and separated therefrom, said enclosure means including means defining a storage reservoir in a lower portion of said enclosed volume, heat exchange means carried by said enclosure means in an upper portion of said enclosed volume in free and unobstructed spatial communication with said lower portion of said enclosed volume including said storage reservoir, means for feeding inlet water from said heat exchange means to said evaporator chamber including means providing a feed path for inlet water to said evaporator chamber, means for limiting entry of water into said evaporator chamber to a preselected level within said evaporator chamber and means coupled into said feed path between said heat exchange means and said evaporator chamber for discharging inlet water flowing through said heat exchange means in excess of that required to maintain said preselected level such that discharged excess inlet water flows through a defined path in said apparatus which excludes said evaporator chamber, means providing a vapor column extending upwardly through said lower portion of said enclosed volume for directing steam from said evaporator chamber into said upper portion of said enclosed volume into the region of said heat exchange means, and water inlet means for connecting said heat exchange means to a supply of water comprising a water control valve including means suspended within said upper portion of said enclosed volume above said vapor column and responsive to temperature of steam exiting said vapor column into said upper portion for admitting water from the said supply to said heat exchange means and thence to said evaporator chamber only when said temperature of said steam exiting said vapor column indicates operation of said heating means, said heat exchange means being constructed and arranged to effect heat exchange between water passing from said inlet means and steam circulating in said upper portion of said enclosed volume to preheat water passing from said inlet means to said evaporator chamber and simultaneously to condense steam on said heat exchange means for dripping by gravity as distillate into said storage reservoir.

2. The apparatus set forth in claim 1 further comprising means defining an enclosed chamber intermediate said evaporator chamber and said enclosed volume, switch means disposed in said intermediate chamber and electrically connected to said heating means, and float means including a hollow sleeve extending vertically through said storage reservoir, a float suspended by said sleeve for limited vertical movement within said storage reservoir as a function of level of water in said storage reservoir, and an actuator coupled to said float and slidably extending downwardly through said sleeve for operative engagement with said switch means to apply electrical power to said heating means when said water level drops below a desired minimum level.

3. The apparatus set forth in claim 1 or 2 wherein said inlet means further comprises a flow control fitting for automatically admitting water from the said supply at a substantially constant rate independent of water pressure at said supply.

4. The apparatus set forth in claim 1 or 3 wherein said vapor column includes first baffle means comprising a spiral ribbon extending upwardly through said column for routing steam through a spiral path within said column between said evaporator chamber and said heat exchange means, and wherein said evaporator chamber includes second horizontal baffle means suspended below said vapor column and cooperating with said first baffle means for retarding flow of contaminants in steam generated in said evaporator chamber.

5. The apparatus set forth in claim 1 or 3 wherein said evaporator chamber comprises level control means for maintaining water in said chamber below a selected maximum level and means forming a surface coating of scale resistant material such as fluoroplastic at least on portions of said chamber below said maximum level.

6. The apparatus set forth in claim 5 wherein said heating means comprises an electrical heating coil carried externally of said evaporator chamber.

7. The apparatus set forth in claim 1 or 3 wherein said means for feeding water to said evaporator chamber comprises downpipe means carried externally of said storage reservoir and including means for directing water from said heat exchange means into an upper end of said downpipe means and means providing an opening in an upper end of said downpipe means for permitting escape of volatilized gases as water falls by gravity through said downpipe means, and means including a spiral ribbon extending downwardly through said downpipe means for promoting agitation in water flowing downwardly through said downpipe means.

8. The apparatus set forth in claim 1 or 3 wherein said means for feeding water to said evaporator chamber comprises conduit means extending upwardly from said heat exchange means and then downwardly to said evaporator chamber, said conduit means having an apex disposed above said heat exchange means such that said heat exchange means is maintained full and water is fed by inlet water pressure to said evaporator chamber.

9. The apparatus set forth in claim 1 or 3 wherein said means providing a feed path comprises downpipe means carried externally of said reservoir and connecting said heat exchange means to said evaporator chamber at a level below said preselected level, and wherein said means for discharging excess inlet water comprises drain means connected to said downpipe means externally of said storage reservoir at said preselected level.

10. Water distillation apparatus comprising an evaporator chamber including means for heating water in said chamber to form steam, water inlet means including means for feeding water from an external supply, a storage reservoir disposed above said evaporator chamber, means including a vapor column extending upwardly through said storage reservoir to feed steam from said evaporator chamber to an upper portion of said storage reservoir, heat exchange means constructed and arranged in said upper portion of said storage reservoir for effecting heat transfer between steam rising from said evaporator chamber and water from said supply such that the said steam is condensed to fall by gravity as distillate into said storage reservoir, means for feeding inlet water from said heat exchange means to said evaporator chamber including means providing a feed path for inlet water to said evaporator chamber, means for limiting entry of water into said evaporator chamber to a preselected level within said evaporator chamber and means coupled into said feed path between said heat exchange means and said evaporator chamber for discharging inlet water flowing through said heat exchange means in excess of that required to maintain said preselected level such that discharged excess inlet water flows through a defined path in said apparatus which excludes said evaporator chamber, and a water control valve coupled to said water inlet means and suspended from said inlet means within said upper portion of said storage reservoir, said valve including means responsive to ambient steam temperature in said upper portion of said storage reservoir adjacent said heat exchange means for feeding water from said supply to said evaporator chamber through said heat exchange means only when said temperature indicates operation of said heating means.

* * * * *